United States Patent [19]
Johnson et al.

[11] Patent Number: 5,920,474
[45] Date of Patent: Jul. 6, 1999

[54] POWER SUPPLY FOR ELECTROSTATIC DEVICES

[75] Inventors: Nathaniel M. Johnson, Laconia; S. Edward Neister, New Durham, both of N.H.

[73] Assignee: Zero Emissions Technology Inc., New Durham, N.H.

[21] Appl. No.: 08/858,904

[22] Filed: May 19, 1997

Related U.S. Application Data

[63] Continuation-in-part of application No. 08/388,514, Feb. 14, 1995, Pat. No. 5,631,818.

[51] Int. Cl.$^6$ ...................................................... H02M 7/06
[52] U.S. Cl. ............................................................. 363/126
[58] Field of Search ................................. 363/67, 68, 84, 363/85, 125, 126, 128, 129, 135, 136

[56] References Cited

U.S. PATENT DOCUMENTS

| | | |
|---|---|---|
| 2,999,970 | 9/1961 | Schwesig et al. . |
| 3,648,437 | 3/1972 | Bridges . |
| 3,772,853 | 11/1973 | Burge et al. . |
| 3,824,444 | 7/1974 | Spink . |
| 4,063,143 | 12/1977 | Forstbauer .................................. 363/40 |
| 4,210,949 | 7/1980 | Masuda . |
| 4,255,784 | 3/1981 | Rosa . |
| 4,366,532 | 12/1982 | Rosa et al. . |
| 4,482,945 | 11/1984 | Wolf et al. . |
| 4,600,411 | 7/1986 | Santamaria . |
| 4,787,023 | 11/1988 | Thomas . |
| 4,996,471 | 2/1991 | Gallo . |
| 5,225,815 | 7/1993 | Bocquet et al. . |
| 5,267,137 | 11/1993 | Goebel . |
| 5,694,307 | 12/1997 | Murugan .................................... 363/37 |

FOREIGN PATENT DOCUMENTS

| | | |
|---|---|---|
| 549961 | 8/1956 | Belgium . |
| 0249083 | 12/1987 | European Pat. Off. . |
| 477389 | 1/1938 | United Kingdom . |

*Primary Examiner*—Matthew Nguyen
*Attorney, Agent, or Firm*—Phillip E. Decker

[57] ABSTRACT

A power supply method particularly adapted for use with an electrostatic particulate collection device to provide substantially ripple-free DC power for improved operation. The power supply is adapted to receive three-phase AC power and to transform the AC power into high voltage DC power having a minimum of voltage ripple in the output. The power supply includes a multi-phase transformer having three primary windings, each of the primary windings having associated with it a pair of secondary windings. The primary windings can be either delta connected or wye connected. One of each of the secondary windings associated with one of the respective primary windings are connected together in a delta connection arrangement, and the remaining secondary windings are connected in a wye connection arrangement. Because the respective AC voltage outputs of each of the secondary windings is out of phase with the AC voltage outputs of the other secondary windings, the resultant combined DC output voltage, after the DC voltages have been rectified in a three-phase full-wave bridge rectifier stack, produces minimum ripple voltage and current, without requiring additional, more expensive, and less reliable components.

19 Claims, 3 Drawing Sheets

POWER SUPPLY FOR ELECTROSTATIC DEVICES

This is a continuation-in-part of application Ser. No. 08/388,514, filed Feb. 14, 1995, U.S. Pat. No. 5,631,818.

BACKGROUND

1. Field of Invention

The present invention relates to an electrical power supply method and apparatus for providing electrical power to operate particle-charging and particle collecting electrodes of an electrostatic collecting device, such as an electrostatic precipitator, by permitting the formation within the device of an electrostatic field to electrically charge the particles to be collected and to collect the particles on the collection surfaces. More particularly, the present invention relates to an electrical power supply method for converting the power provided by a three-phase, alternating current power source to direct current power in order to provide a more uniform DC voltage potential to the collection surfaces in an electrostatic collection device for improved particle collection and improved precipitator operation.

2. Description of the Related Art

Electrostatic precipitators, and other electrostatic collection devices, have taken on considerably greater importance in recent years, particularly in view of the increased emphasis upon maintaining a clean environment. That increased emphasis includes air pollution control by maintaining clean exhausts from industrial processes that involve the combustion or other form of transformation of materials, and that result in the generation of particulate matter as a consequence of carrying out the process. The techniques and structural elements incorporated in modem electrostatic precipitators, particularly the electrical control apparatus for controlling the power provided for charging the particulate matter to be collected, as well as the power provided to the collection surfaces, have been continually refined to more completely remove particulates from stack gases, such as from chemical process exhaust gases and from fossil fuel electric generating plant exhaust gases, and also to provide longer useful operating life for the precipitator components.

The most common electrostatic collection device is an electrostatic precipitator comprising charged electrodes and grounded plates or tubes. Other electrostatic devices include electrostatic filter beds, or "rock scrubbers," wherein the collecting surfaces are the surfaces of rocks or pebbles. This invention useful in any application in which particles are removed from a gas stream by the use of electrostatic forces.

The theory behind the operation of an electrostatic precipitator involves the generation of a strong electrical field through which stack gases pass, so that the particles carried by the stack gases can be electrically charged. By charging the particles electrically they can be separated from the gas stream and collected, and thereby not enter and pollute the atmosphere. The generation of such electrical fields requires electrical power supplies that can provide a high DC voltage to charge the particulate matter and thereby permit its collection. The existing systems are based upon AC corona theory, using a single-phase transformer-rectifier set to rectify AC power to DC power and provide a high DC potential between a charging electrode, to charge the particles, and a collection surface, usually a plate, so that the stack gases are subjected to the maximum current obtainable through the gas without complete breakdown. That approach is believed to produce the maximum ionization of the particles and thereby the maximum efficiency in effecting removal of such particles.

Heretofore, the emphasis in particulate removal was placed on increasing the current flow between a grid and a plate defining the electrostatic precipitator collection surfaces, to a current level that produced a maximum of sparking between the grid and the plate. In fact, some precipitators incorporated a grid structure that contains barbed wire or special pointed rods, specifically to enhance such sparking. The sparking inside a precipitator is believed to be necessary as an indicator that the maximum possible current is being drawn, and therefore the maximum possible ionization of the gases and particles is taking place. The practice of encouraging sparking is emphasized, even though it is known that sparking produces stresses upon the electrical components of the system, and it also causes increased precipitator maintenance because of the production of agglomerated particles, sometimes called "ash balls" or "klinkers," and also causes difficulty in ensuring that the "rappers," which are devices that vibrate precipitator plates to remove collected particles, are, in fact, operative and are removing collected particulate material.

Part of the problem that results from operating a precipitator or other collection device at a level at which sparking occurs is that the automatic controller for the transformer-rectifier set must sense an arc and immediately reduce the voltage on the precipitator plate, because any spark can quickly create an arc between the plate and the electrode, with a resultant high current flow. The high current flow can cause severe damage to the precipitator grid, plate, or other collecting surface; it can cause the transformer-rectifier set to fail; it can cause the controller to fail; or it can open the overcurrent protectors that a provided in the incoming power line. Any of those incidents will cause a section of the precipitator to be temporarily off-line, with the resultant passing of the particulates into the atmosphere until the failures have been repaired. Repair can be a matter of minutes, or it can be weeks if the transformer-rectifier set or controller has to be replaced.

Transformer-rectifier sets in most prevalent use are operated based upon single-phase alternating current as the power source. However, a single phase source does not produce the most steady high voltage field for efficiently collecting particulates. Additionally, the voltage control apparatus for such a transformer-rectifier set must be quite sophisticated to prevent component failures, it requires a high level of maintenance on the grid works, and, because it introduces inefficiencies, the control apparatus involves a higher consumption of electrical power than would otherwise be necessary. The high power consumption requires larger, more expensive transformer-rectifier sets, which thereby increases the capital cost to the owner or operator of the process equipment.

For the foregoing reasons, there is a need for an improved high-voltage power supply for electrostatic particle collection devices that overcomes the shortcomings of previous devices and provides a substantially uniform output voltage, with a minimum of voltage fluctuation or ripple.

SUMMARY

The present invention is directed to a method and apparatus that satisfies these needs. One version of an improved power supply for electrostatic devices receives three-phase AC power that is provided through the primary side of a three-phase transformer that includes three primary windings and six secondary windings, two secondary windings for each of the primary windings. The outputs of the respective secondary windings are combined through a bridge rectifier stack to provide a substantially smooth DC voltage output. A microprocessor based multi-port controller can be provided to respond to the output current and output voltage from the rectifier stack to provide appropriate control signals for an input voltage controller and for a switching arrangement for controlling the power from the power source.

In accordance with another version of the present invention, a transformer structure adapted for providing substantially smooth DC voltage output is provided, and is particularly adapted for use in an electrostatic particulate collecting device such as an electrostatic precipitator. The transformer receives power from a three-phase AC power source and includes three primary windings that can be interconnected in either a delta or wye arrangement. Each primary winding is operatively associated with a pair of secondary windings, wherein one secondary winding of each pair is connected with one of each of the other secondary windings in a delta configuration, and the remaining secondary windings are connected together in a wye configuration. The twelve AC voltage outputs from the secondary windings are operatively connected with an array of twelve rectifiers defining a full-wave bridge rectifier stack to provide a combined DC voltage output wherein the average voltage level substantially coincides with the maximum voltage level, to provide a substantially ripple-free voltage output.

Another version of the present invention employs a current-limiting reactor (CLR) operatively connected in series to each of the three input legs of the primary windings. Yet another version of the present invention employs a secondary impedance element operatively connected to the power supply output. The secondary impedance element can be a two-stage, high voltage inductor substantially as disclosed in U.S. Pat. No. 5,629,842, that issued on May 13, 1997.

These and other features, aspects, and advantages of the present invention will become better understood with regard to the following description and accompanying drawings.

DRAWINGS

DESCRIPTION

Figure 1:
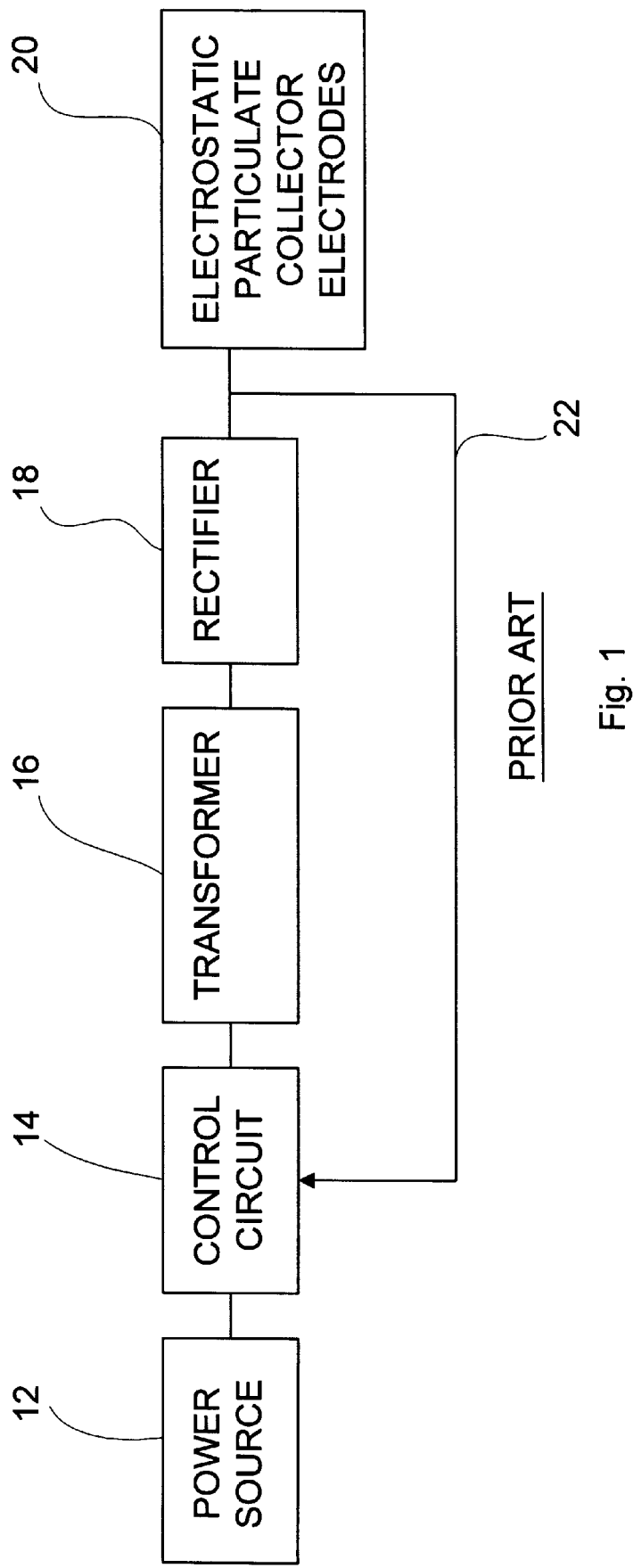
FIG. 1 is a block diagram showing the general form of a prior art power supply system that can be employed in an electrostatic precipitator.

Referring now to the drawings, and particularly to FIG. 1 thereof, there is shown in block diagram form the arrangement of the several elements constituting a basic, prior art power supply 10 for an electrostatic precipitator. The power supply shown transforms alternating current from a single-phase AC power source 12 into direct current. The AC power source 12 is connected with the input terminals of a control circuit 14, the output of which is connected with the primary winding terminals of a power transformer 16, which either steps up the AC voltage, or steps down the AC voltage, depending upon the number of turns of wire defining each of the primary and secondary windings of the transformer 16. For an electrostatic precipitator power supply arrangement, the transformer 16 is configured as a step up transformer that provides a larger output or secondary voltage than the input or primary voltage.

The output of the transformer 16 is provided at the input of a rectifier 18, which can be either a half-wave rectifier or a full-wave rectifier. The rectifier 18 serves to eliminate the negative-going portion of the voltage waveform at the output of the transformer 16, and to convert the alternating current output at the secondary of the transformer 16 to direct current. The output from the rectifier 18 is essentially pulsating, non-steady-state DC power, and is provided to input terminal of an electrode 20 of an electrostatic precipitator. Present practice in the electrostatic precipitator field does not utilize any post-rectification filtering of the waveform before it is applied to the precipitator electrodes. Instead, the AC corona discharge theory on which present practice is based contemplates that ripple voltage is necessary to provide the best operation for removing the fly ash.

The control circuit 14 receives as an input a rectifier output current or voltage 22, usually represented as the voltage across a series resistor (not shown) positioned on the output side of the rectifier 18, or as the output current from the rectifier 18. The control circuit 14 is adapted to sense the currents and voltages on the output or secondary side of the transformer 16, and to provide a suitable control signal to limit the power to the primary side of the transformer 16 should the transformer secondary voltage or current exceed a predetermined value, such as when arcing occurs within the precipitator, to limit transformer primary voltage and thereby prevent damage to the transformer and rectifier.

Figure 2:
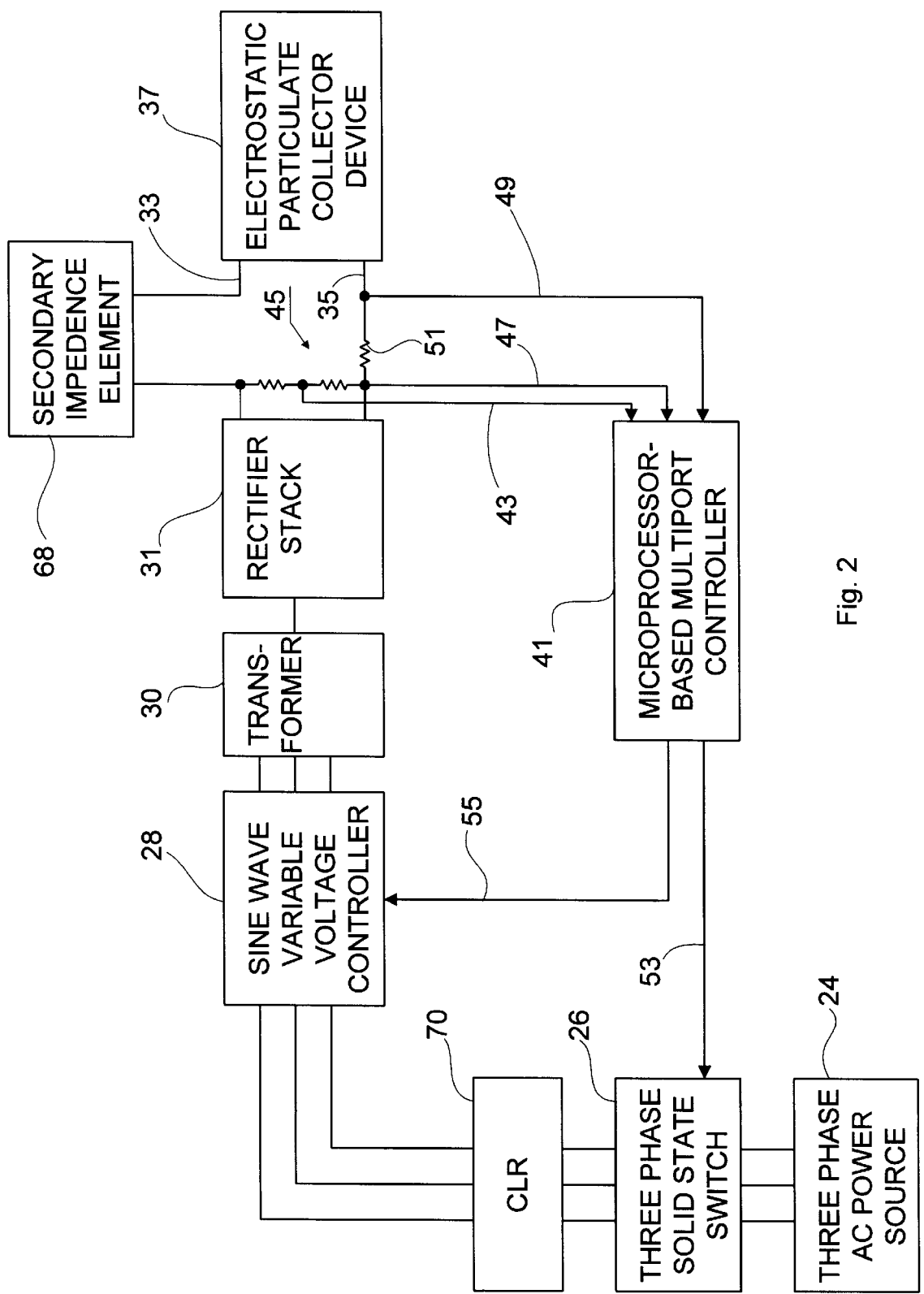
FIG. 2 is a block diagram, partially in schematic form, showing a power supply system in accordance with the present invention for providing from an AC input power source smooth, substantially ripple-free DC output power for operating the particle charging and particle collection surfaces of an electrostatic particle collecting device.

The corresponding block diagram for a power supply circuit in accordance with the present invention is shown in FIG. 2. The present invention contemplates a power source 24 to provide three-phase AC power, the respective phases of which are connected with a three-phase solid state switch 26. The switch can be a commercially available type well known to those skilled in the art. The precise model of switch that can be provided in a given system is dependent upon the power rating and other operating parameters of the circuit. In that regard, a solid state switch is preferred from the standpoint of switching speed, because such a switch can be switched off in a half power cycle or less. Fast switching provides the benefit of reduced damage to electronic parts in the power supply circuit and also in the transformer-rectifier set. However, if fast switching is not critical for protection of downstream circuit elements, a standard three pole motor contactor can be employed.

In one embodiment, current limited reactors (CLR) 70 can be provided between the switch 26 and the sine wave variable voltage controller 28. One CLR is contemplated for every phase of the power input.

A sine wave, variable voltage controller 28 of a type well known to those skilled in the art is connected between the switch 26 or CLR 70 and a transformer 30 to control the input voltage to the primary windings of the transformer 30, which thereby also controls the transformer output voltage provided by the transformer secondary windings. The transformer 30 is adapted to receive three-phase AC power from the voltage controller 28 and to provide as output a plurality of stepped-up AC voltages that are provided to a rectifier bank, or rectifier stack, 31 to convert the several transformer output voltages from AC to a single DC voltage. The DC power output from the rectifier bank 31 is passed through power conductors 33 and 35 to the electrostatic particulate collection device 37.

In one embodiment of the present invention, a secondary impedance element 68 can be electrically connected in series between the rectifier stack 31 and an electrostatic particulate collection electrode. The impedance element may comprise one or both of a coil of a continuous length of wire electrically connected in series with a plurality of ferrite elements. Such an impedance element is disclosed in U.S. Pat. No. 5,629,842, Two-Stage, High Voltage Inductor, that issued on May 13, 1997. Use of this device as shown reduces voltage ripple even further, and has the effect of electrically filtering out high frequency voltages often found in power supply components that tend to cause arcs and sparks, thereby reducing their occurrence.

Additionally, a controller 41 is provided between the output of the rectifier bank 31 and each of the switch 26 and controller 28. The controller 41 is adapted to receive along line 43 from a voltage divider 45 an input signal representative of the output voltage from the rectifier bank 31, and along lines 47 and 49 from respective ends of a resistor 51 input signals representative of rectifier output current. The controller 41 provides as output a pair of control signals along lines 53 and 55 based upon those input signals for controlling the operation of each of the solid state switch 26 and the voltage controller 28 respectively.

As shown in FIG. 2, the controller 41 receives signals along lines 43, 47, and 49 indicative of the operating condition of the particulate collector electrodes 37 by detecting the rectified DC output voltage and current drawn by the electrodes 37. If the voltage to the electrodes 37 is above a predetermined value, an output signal is provided along line 55 to the sine wave variable voltage controller 28 to reduce the transformer input voltage level. Similarly, rectifier output current as drawn by the electrodes 37 is detected by signals provided to the controller 41 along lines 43, 47, and 49, and the controller 41 provides an output signal along line 53 to control the operation of the solid state switch 26, and also to an appropriate signal to shut down the system in the event of excessive current draw. The controller 41 is preferably a microprocessor-based controller, and a suitable controller of that type is available as model No. IPS-101, available from SHL Design Corp.

A commercially available opacity monitor (not shown) of any known type can optionally be provided as a part of an electrostatic particulate control system to detect and monitor the opacity of the stack exhaust gases. The opacity monitor permits an assessment of the effectiveness of particulate separation by the precipitator, and it preferably provides either an aural or a visual output signal to indicate the opacity level or, alternatively, to indicate when the opacity exceeds a predetermined level.

Figure 3:
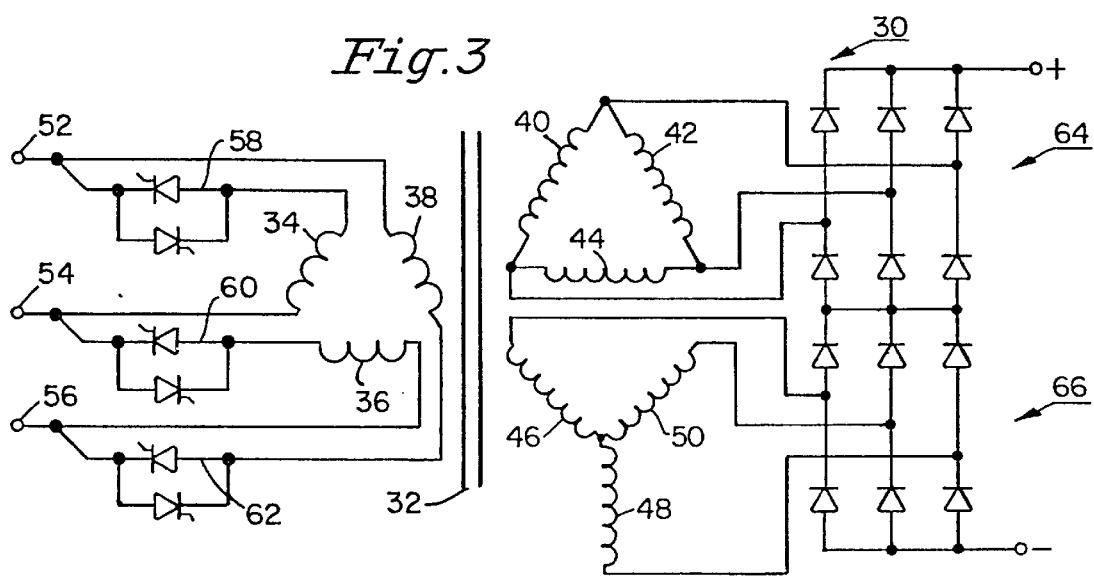
FIG. 3 is a schematic diagram showing the electrical arrangement of one form of high-voltage transformer in accordance with the present invention for transforming three-phase AC voltage into substantially ripple-free DC voltage.

A preferred form of the transformer 30 in accordance with the present invention for use in a power supply for an electrostatic particulate control device, such as the power supply shown in block diagram form in FIG. 2, is illustrated schematically in FIG. 3. The transformer 30 is a step-up transformer, and it includes a conventional, preferably laminated, iron core 32, three primary windings 34, 36, and 38, and six secondary windings 40 through 50. Although disclosed in the context of an iron core, if the input source provides high-frequency, three-phase power, a ceramic core can alternatively be employed.

Each primary winding has associated with it a pair of secondary windings, the latter of which provide as outputs a plurality of phase-displaced, stepped-up, AC voltage outputs. Specifically, the primary winding 34 has associated with it secondary windings 40 and 46, primary winding 36 has associated with it secondary windings 42 and 48, and primary winding 38 has associated with it secondary windings 44 and 50. As shown in FIG. 3, primary windings 34, 36, and 38 are connected in a delta connection arrangement, secondary windings 40, 42, and 44 are also connected in a delta connection arrangement, and secondary windings 46, 48, and 50 are connected in a wye connection arrangement.

The transformer 30 preferably includes a grounded electrostatic shield (not shown) to block undesirable electrical noise emitted by the transformer 30 from affecting adjacent electrical devices. A suitable shield can be a standard copper foil shield that includes one isolated turn of foil, having the same width as the primary winding, and installed in overlying relationship with the primary winding. A lead from the foil shield extends either to the core or to the frame of the transformer to drain off any common mode signals that may be present. The shield also prevent unwanted high frequency signals from being transferred between the primary and secondary windings, thereby substantially reducing potential interference with the low level signals used in the electronic controller.

In one embodiment, the entire transformer assembly 30 can be installed in a container and immersed in a high dielectric insulating oil to electrically insulate the components from each other. In another version, the transformer assembly 30 can be potted in an epoxy resin or other solid insulating material. The choice of insulating material depends on the voltages and currents in the particular application, and its selection is within the ability of one having ordinary skill in the art.

Preferably, the windings of the transformer 30 are arranged on the core in a configuration that provides a higher impedance to the load than would normally be provided. The high impedance results from increasing the spacing between the primary and secondary coils and also from winding the secondary coils side-by-side, instead of one above the other as is conventional for the purpose of reducing leakage reactance and thereby reducing the effective impedance of the transformer output. The increased impedance provides a "soft" output voltage that automatically decreases whenever the electrostatic particulate collection device sparks or arcs over. The resulting decrease in voltage limits the energy in the arc and thereby reduces the possibility of damage to the collection device, while simultaneously reducing the production of ozone. Moreover, the high impedance within the transformer also serves to limit the output current to the collection device, thereby also limiting the current drawn through the rectifier stacks. Limiting the rectifier current draw protects the rectifiers from failure from instantaneous overcurrent. The built-in, increased impedance of the transformer in accordance with the present invention also operates to limit the instantaneous high currents that would otherwise be reflected to the primary windings, thereby protecting the primary power controller and other electronic components from burning out from excessive current.

As shown in FIG. 3 the three individual primary windings 34, 36, and 38 are connected together in a delta configuration to define the interconnected transformer primary section. Each of the nodes 52, 54, and 56 of the delta-configured primary windings is electrically connected with a respective transformer power input terminal. Between each primary winding and the nodes 52, 54, and 56 is a reverse-blocking, triode-type P-type gate thyristor 58, 60, and 62, respectively, that is defined by a pair of silicon-controlled rectifiers (SCR's), each having a gate to receive a current pulse for the purpose of turning on the respective thyristors.

The six secondary windings are connected together in two groups of three windings each, and each of a pair of the secondary windings is associated with one of the primary windings. Secondary windings 40, 42, and 44 are connected together in a delta-type connection and secondary windings 46, 48, and 50 are connected together in a wye-type connection. One of each of the wye and delta-connected secondary windings is associated with one of the primary windings. As will be apparent to those skilled in the art, the output voltages generated in the respective secondary windings are phase-displaced from each other by 120 degrees in each of the delta and wye secondary loops. Additionally, the delta and wye outputs are phase displaced from each other by 60 degrees, so that the respective output terminals provide six output voltages that are phase displaced from each other.

Each of the three phase AC output voltages from each of the interconnected delta and wye secondary windings of the transformer is converted to DC in a pair of rectifier arrays 64 and 66. Each rectifier array 64, 66 is a full-wave, three phase rectifier bridge that includes six semiconductor diodes that are driven by the transformer secondary voltages provided by the delta and wye secondary windings, respectively. The rectifier arrays 64 and 66 are connected in series to define a rectifier stack, and the combined outputs from the series-connected rectifier arrays provide the source of DC voltage for the electrostatic particulate collector electrodes.

The rectifier stack illustrated in FIG. 3 includes twelve individual, high-voltage semiconductor diode assemblies. Each diode assembly is formed by individual diode junctions in series, properly compensated so that the assembly is rated to withstand several times the high inverse voltage present in the system. The compensation is provided to ensure that the reverse voltage appearing across the assembly is equally shared by each of the individual diode junctions, and the assemblies can be so packaged to permit as few as two packages that contain the total of twelve high voltage diodes. It will be apparent to those skilled in the art that more or fewer diodes can be provided, depending upon the output voltage desired, based upon the particulate electrostatic particulate collection system involved.

In operation, an operator initially sets the desired voltage and current levels based upon previous experience data. On initialization of the system, the rectifier voltage output starts from zero and ramps up to the final desired voltage setting. Output voltage is limited automatically as a result of rectifier output current exceeding the preset maximum current setting, or spark sense integrator module sensing incipient sparking over, or rectifier output voltage exceeding the preset maximum voltage setting. When steady-state operation is achieved, output voltage is automatically varied, such as sensing by a stack gas opacity detector, or based upon rectifier output current or rectifier output voltage. The output voltage preferably will also vary based upon any changes in the sparking characteristics of the flue gases because of changes in the gas chemistry, the moisture content, the gas temperature, and the like.

In the event of severe sparking, or a direct short circuit at the rectifier output, the short circuit sense module causes the controller to shut down the power supply immediately (within two milliseconds or less), to reduce the output voltage level to prevent a short circuit arc. That may or may not result in the voltage going to zero. The purpose of reducing the voltage as soon as possible is to quench the arc by reducing the power that would be necessary to sustain the arc. Long duration arcing, longer than ten cycles or 160 milliseconds, typically require up to ten times the current that would normally be produced by the transformer-rectifier set. That level would cause damage either to the rectifiers, to the transformer, or to the electrodes or other components within the electrostatic device. Restart is automatic with the rectifier output voltage being ramped up as in an initial startup condition. Optionally, a fault recorder (not shown) of known construction can be provided to time the fault, and if a second shutdown occurs within a predetermined time interval, the controller can shut down the power supply, activate an alarm, and require manual override in order to again commence operation. In the event of severe sparking, the rectifier output voltage can be reduced by the controller to a level at which sparking is reduced, as a result of which the controller 41 can reduce the voltage at the output of the voltage controller 28, which will, in turn, reduce the field intensity and the tendency to spark.

The present system as herein disclosed is fully balanced without the need for sophisticated and complicated sequencing circuits or phase shift balancing circuits normally required in three phase systems. Feedback is by level detection only, and is not dependent upon the typical phase/gain relationship upon which conventional feedback controlled power supply systems are based.

Because of the out-of-phase relationship of the several AC voltages provided by the secondary windings, the resulting output voltage has extremely little ripple, and consequently control of the electrostatic device is simplified. In fact, it has been found that the ripple in the output voltage from the preferred transformer construction as herein described is less than one percent. And the frequency of the ripple is twelve times the frequency of the AC source (720 Hz for a 60 Hz AC source frequency).

Additionally, the likelihood of sparking is minimized without the need for additional electrical filtering by reducing the magnitude of any alternating frequency component in the voltage and current. Because the dielectric strength of fly ash, as well as of other stack materials, is frequency dependent, pure DC voltage will not cause sparks until a significantly higher voltage level is reached than the voltage level at which sparking begins to occur when voltage having significant ripple, or an AC component, is provided to the electrostatic device electrodes. Consequently, removing the ripple and providing a nearly pure DC voltage operates to effectively increase the dielectric strength of the fly ash, which results in higher operating voltages on the electrode and collector surfaces, producing a resultant increase in the efficiency of particulate collection.

When the structural elements of the present invention are provided, the increased and more uniform electrical field provided by the electrodes reduces the amount of power that must be applied, it simplifies the controls that are needed, and it thereby provides significant cost savings because of the reduction in the power required and the reduction in maintenance that would otherwise be required because of the sparking that occurs in the prior art devices. The reduction of sparking and arcing inside the device reduces the amount of ultraviolet light that is produced, which can retrigger new arcing events. Reducing that source of intense ultraviolet light can also produce a concomitant reduction in ozone that is produced when ultraviolet light breaks down the gaseous oxygen's covalent bond.

Figure 4:
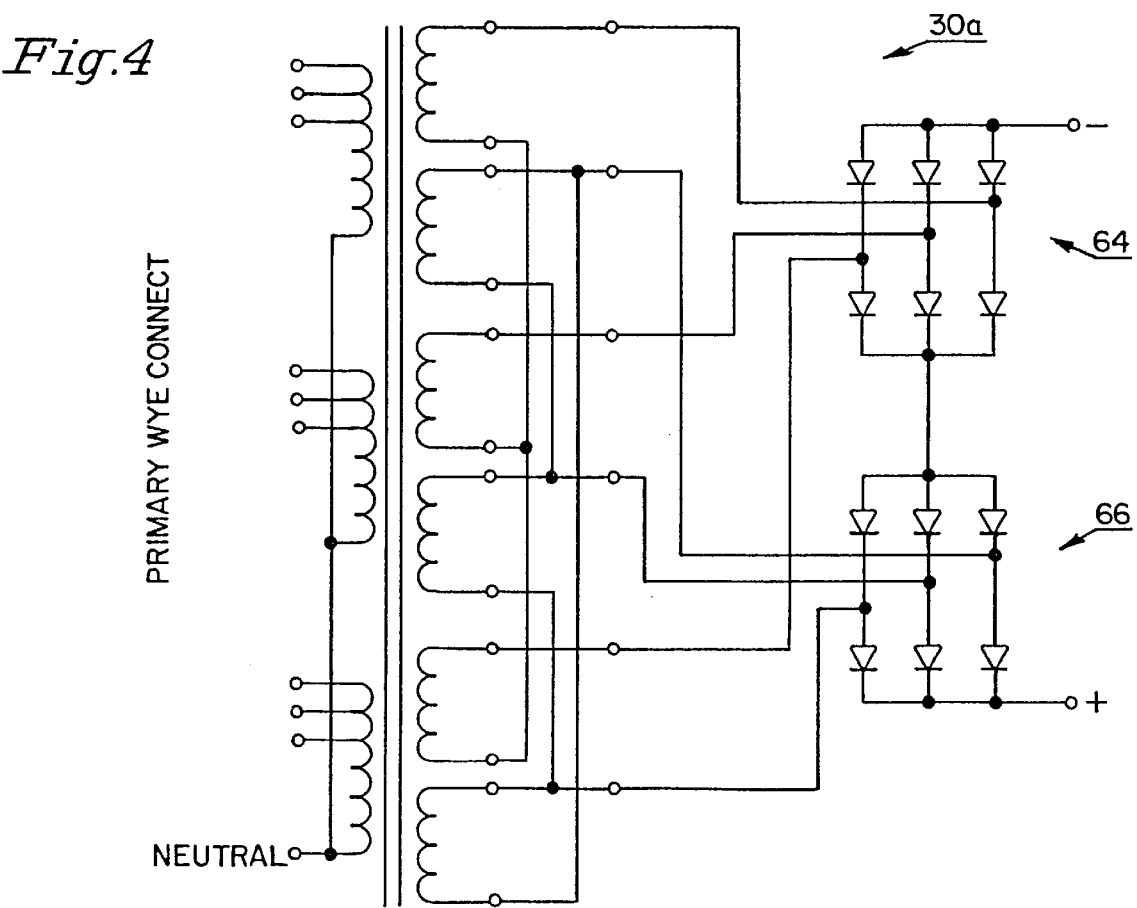
FIG. 4 is a schematic electrical diagram similar to that of FIG. 3 but showing an alternative embodiment of a transformer in accordance with the present invention for transforming three-phase AC voltage into substantially ripple-free DC voltage.

Although shown in FIG. 3 as connected in a delta configuration, the primary windings of the transformer in accordance with the present invention can also be connected in a wye connection arrangement, as illustrated in the schematic diagram of FIG. 4. In all other respects, the structure of the transformer 30a and the rectifier arrays 64 and 66 shown in FIG. 4 are the same as those shown in FIG. 3. Again, the combined AC voltage outputs of the secondary windings of the transformer 30a, after passage through the rectifier arrays, provide a significantly smoother DC voltage output. That smoother output voltage is obtained without the need for additional electrical filtration of the transformer output, as contrasted with outputs from single-phase transformers of the type that are now common in the electrostatic device field.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

We claim:

1. A method for providing a substantially ripple-free DC voltage to an electrostatic particulate collection device from a source of three-phase AC power, said method comprising:

a) applying three-phase AC power from a three-phase AC power source to primary windings of a transformer having three primary windings connected in a delta connection arrangement;

b) arranging three pairs of secondary windings in electromagnetically coupled relationship with respective ones of the primary windings, wherein respective ones of the windings of each pair of secondary windings are connected in a wye connection arrangement to provide a plurality of first output voltages and the remaining ones of each pair of the respective secondary windings are connected in a delta connection arrangement to provide a plurality of second output voltages;

c) coupling the first three output voltages with a first full wave rectifier stack to provide a first rectified output voltage;

d) coupling the second three output voltages with a second full wave rectifier stack to provide a second rectified output voltage;

e) coupling the first and second rectifier stacks in series to provide a substantially ripple-free DC output voltage; and f) coupling the DC output voltage with an electrostatic particulate collection device electrode.

2. A method in accordance with claim 1 including the step of placing the secondary coils in side-by-side relationship.

3. A method for providing a substantially ripple-free DC voltage to an electrostatic particulate collection device from a source of three-phase AC power, said method comprising:

a) applying three-phase AC power from a three-phase AC power source to primary windings of a transformer having three primary windings connected in a wye connection arrangement;

b) arranging three pairs of secondary windings in electromagnetically coupled relationship with respective ones of the primary windings, wherein respective ones of the windings of each pair of secondary windings are connected in a wye connection arrangement to provide a plurality of first output voltages and the remaining ones of each pair of the respective secondary windings are connected in a delta connection arrangement to provide a plurality of second output voltages;

c) coupling the first three output voltages with a first full-wave rectifier stack to provide a first rectified output voltage;

d) coupling the second three output voltages with a second full wave rectifier stack to provide a second rectified output voltage;

e) coupling the first and second rectifier stacks in series to provide a substantially ripple-free DC output voltage; and f) coupling the DC output voltage with an electrostatic particulate collection device electrode.

4. A method in accordance with claim 3 including the step of placing the secondary coils in a side-by-side relationship.

5. A method in accordance with claim 1 wherein the rectifier stack is a half wave rectifier stack.

6. A method in accordance with claim 1 further comprising the step of providing a three-phase solid state switch electrically connected between the three-phase AC power source and the transformer.

7. A method in accordance with claim 6 further comprising the step of controlling the AC power to the transformer by providing a sine wave variable voltage controller electrically connected between the switch and the transformer.

8. A method in accordance with claim 7 further comprising the step of providing at least one current limiting reactor electrically connected between the switch and the transformer.

9. A method in accordance with claim 7 further comprising the step of providing at least one current limiting reactor electrically connected between the switch and sine wave variable voltage controller.

10. A method in accordance with claim 7 further comprising the step of controlling the switch and voltage controller by providing a microprocessor-based controller electrically connected between the rectifier stack and each of the switch and voltage controller.

11. A method in accordance with claim 1 further comprising the step of filtering power by providing a secondary impedance element electrically connected between the rectifier stack and the electrode.

12. A method in accordance with claim 1 further comprising the step of providing three reverse-blocking, triode-type P-type gate thyristors, each one electrically connected to a respective one of the three primary windings.

13. A method in accordance with claim 3 wherein the rectifier stack is a half wave rectifier stack.

14. A method in accordance with claim 3 further comprising the step of providing a three-phase solid state switch electrically connected between the three phase AC power source and the transformer.

15. A method in accordance with claim 14 further comprising the step of controlling the AC power to the transformer by providing a sine wave variable voltage controller electrically connected between the switch and the transformer.

16. A method in accordance with claim 15 further comprising the step of providing at least one current limiting reactor electrically connected between the switch and the transformer.

17. A method in accordance with claim 15 further comprising the step of providing at least one current limiting reactor electrically connected between the switch and sine wave variable voltage controller.

18. A method in accordance with claim 15 further comprising the step of controlling the switch and voltage controller by providing a microprocessor-based controller electrically connected between the rectifier stack and each of the switch and voltage controller.

19. A method in accordance with claim 3 further comprising the step of filtering power by providing a secondary impedance element electrically connected between the rectifier stack and the electrode.

* * * * *